May 19, 1953 K. W. GRAYBILL ET AL 2,639,416
COUNTING RELAY
Filed Sept. 13, 1949 6 Sheets-Sheet 1

INVENTORS.
KENNETH W. GRAYBILL
HANS SENGEBUSCH
BY
ATTORNEY

May 19, 1953    K. W. GRAYBILL ET AL    2,639,416
COUNTING RELAY

Filed Sept. 13, 1949    6 Sheets-Sheet 3

INVENTORS.
KENNETH W. GRAYBILL
HANS SENGEBUSCH
BY

ATTORNEY

INVENTORs.
KENNETH W. GRAYBILL
HANS SENGEBUSCH

ATTORNEY

May 19, 1953     K. W. GRAYBILL ET AL     2,639,416
COUNTING RELAY

Filed Sept. 13, 1949     6 Sheets-Sheet 5

INVENTORS.
KENNETH W. GRAYBILL
HANS SENGEBUSCH
BY
ATTORNEY

Patented May 19, 1953

2,639,416

UNITED STATES PATENT OFFICE 2,639,416

COUNTING RELAY

Kenneth W. Graybill, Elmhurst, and Hans Sengebusch, Villa Park, Ill., assignors to Automatic Electric Laboratories, Inc., Chicago, Ill., a corporation of Delaware Application September 13, 1949, Serial No. 115,468

22 Claims. (Cl. 340—168)

This invention relates in general to selector switches of the type employed in automatic telephony and more particularly to the counting relay type thereof.

An object of the present invention is to provide an improved stepping relay.

One of the novel and essential features of the invention is the relationship of the push bars driven sequentially by a common armature.

Another feature lies in the latching arrangement of the push bars and finger members with the cocking levers insuring the sequential operation of the relay.

Still another feature of this invention resides in the provision of a release mechanism so that a new cycle of stepping may be accomplished from an initial position rather than purely continuous sequential operation.

A further feature of the present invention is the provision of a relay switch having an increased capacity of levels and contacts thereon.

And still another feature of the invention resides in the provision for an opening of all of its contacts upon deenergization so that when employed in an automatic telephone system, no circuits remain closed after a call has been terminated.

These and other objects are accomplished according to the invention, by the arrangement and combination of elements set forth in the following description, defined in the appended claims and exemplified in the accompanying drawings comprising Figs. 1 to 12 in which:

Figure 5:
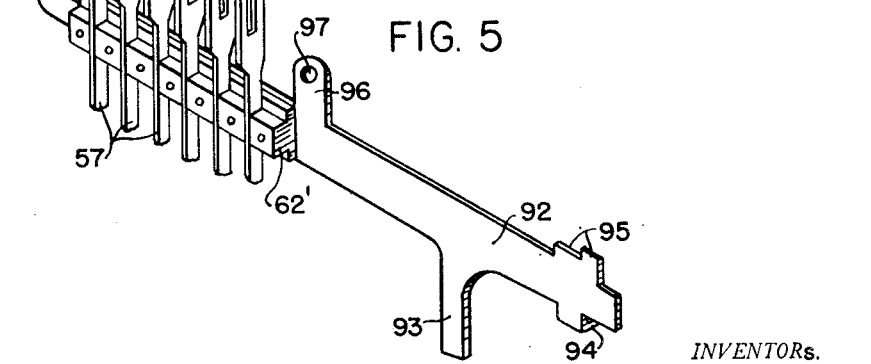

Fig. 5 is an isometric view of one of the driving members or push bars 92. The view shows the arrangement for insulatingly connecting an associated group of contactors 57 to the rear portion thereof and also shows the relation of the lower leg 93, lower right side arm 94, risers 95, upper arm 96 and rearward stroke limiting slot 99 and hook 100 to the remainder of the driving member proper.

Figure 6:
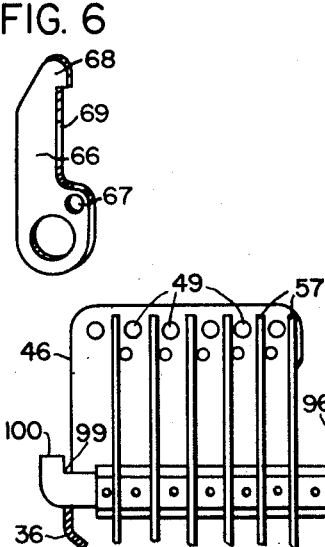

Fig. 6 is an isometric view of one of the cocking levers 66 and shows its engaging head 68, release recess 69 therebelow, spring connecting hole and mounting hole 67.

Figure 7:
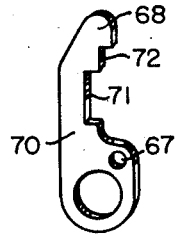

Fig. 7 is an isometric view of the first cocking lever 70 which differs from the cocking lever 66, shown in Fig. 6, only by an additional recess 71 to permit disassociation of itself from the release bar 64 which engages the recesses 69 of the other cocking levers 66.

Figure 8:
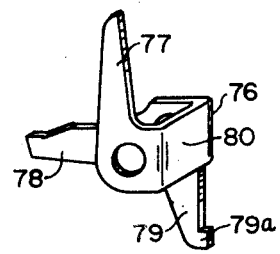

Fig. 8 is an isometric view of a finger member 76 of each cocking mechanism. Each member 76 has a horizontal finger 78 and lower finger 79 in one plane and an upper finger 77 in a parallel plane to the left thereof, all fingers rigidly connected together. Also shown are the mounting holes therefor.

Figure 9:
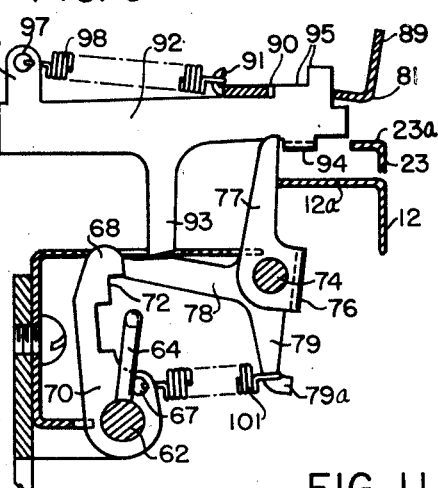

Fig. 9 is a side section of the first driving member 92 and elements of its associated cocking mechanism in normal position with release pawl 12a in position to drive the upper finger 77 of the first push bar individual cocking mechanism.

Figure 10:
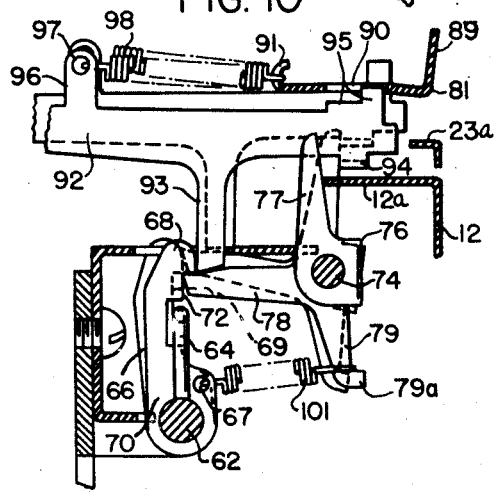

Fig. 10 is a side section of the first and second driving members 92, their associated cocking mechanisms and release and operating pawls 12a and 23a, with release pawl 12a in operated position dropping the first push bar 92. This section also shows the operated position of the release lever 64 in engagement with recess 69 of the second cocking lever 66 but ineffective upon the first cocking lever 70 due to additional recess 71 therein.

Figure 11:
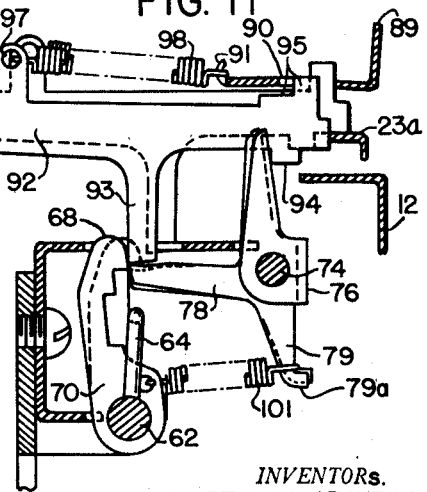

Fig. 11 is a side section showing the same elements as in Fig. 10 except that operating pawl 23a is shown in operated position and the first driving member 92 is shown correspondingly advanced and the horizontal finger 78 of its cocking mechanism disengaged from the head 68 of its cocking lever 70.

Figure 12:
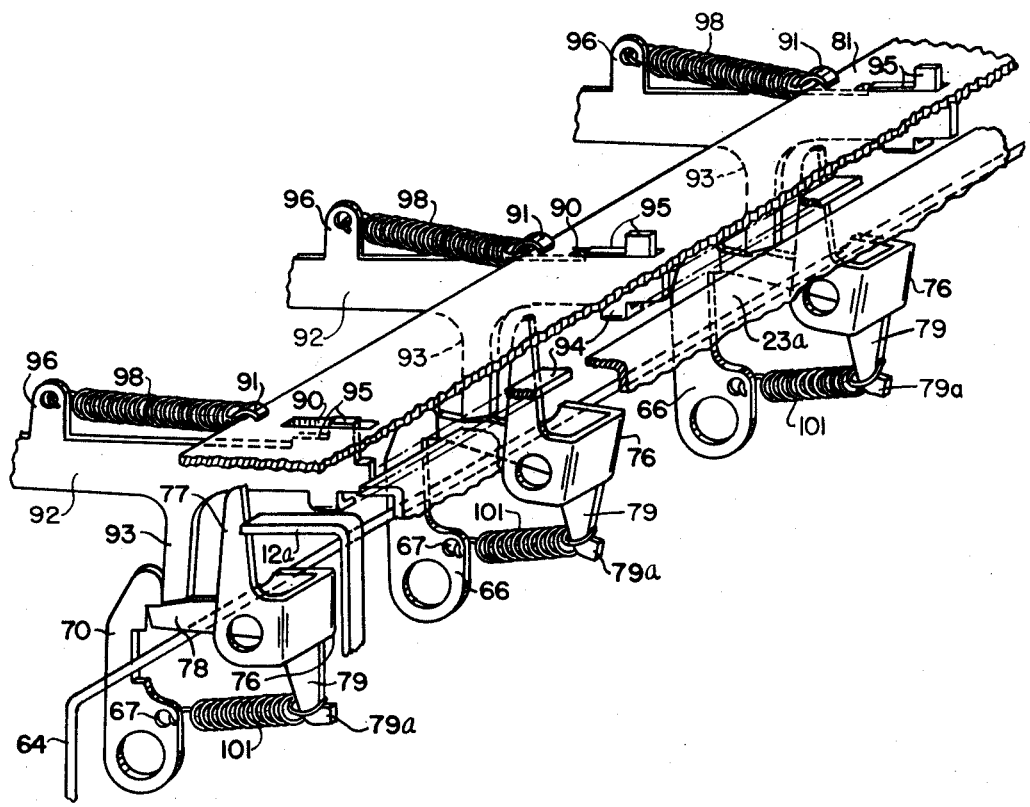

Fig. 12 is an oblique view of several push bars 92 and individual associated cocking mechanisms as well as showing the relation of the risers 95 on the driving members 92 to the slots 99 in the horizontal cross member 81. This view portrays the release magnet pawl 12a in operated position, the first cocking mechanism cocked, the first driving member 92 lowered and all other driving members 92 and associated cocking mechanisms normal. The view also shows the relationship of the operating pawl 23a to push bars 92 and of release lever 64 to cocking levers 70 and 66.

Referring again to the accompanying drawings, a detailed description of the mechanism and its operation follows.

As the instant invention in completed form presents a rather complicated mechanism, it will facilitate the description and render the same more easily understandable to refer to many parts by locative adjectives such as rear, forward and so forth. For this purpose, all such locative adjectives of components will be with relation to the "front" of the device shown in the front view of Fig. 2.

Frame 1 is of the rigid metal structure and may be made from a stamping of cold rolled steel. The frame has a base element 1a. Along the rear edge of the base 1a, connected and arranged perpendicularly thereto, is heelpiece 2. The heelpiece supports two electro-magnets 5 and 6 by means of bolts 7 and 8 through holes in the heelpiece and threaded therethrough into tapped holes in the rear of cores 21 and 35 respectively. The two magnets 5 and 6 are arranged side by side so that their axial center lines are in a plane parallel to the base element 1a. The heelpiece 2 extends upward above the magnets and which it supports. Above the magnets extending longitudinally forward from the lateral edges of the heelpiece 2 are two ears 3 and 4 in parallel planes. These ears are formed from the upper lateral edges of heelpiece 2. Base element 1a, heelpiece 2, and ears 3 and 4 are all formed from a single piece of soft iron and form in their entirety frame 1. Arms 38 and 39 are rigidly attached to ears 3 and 4 and extend horizontally backward therefrom parallel to one another. The forward ends of arms 38 and 39 are narrower than the remainder of the arms and these ends are bent perpendicularly inward to engage slots 40 and 41 respectively which are situated in the upper portion of ears 3 and 4. The arms 38 and 39 are rigidly held in place over and above the action of the forward ends and slots 40 and 41 respectively by bolts 43 and 44 threaded into tapped holes in ears 3 and 4.

On the inner surfaces of arms 38 and 39 rearward of the ears 3 and 4 are attached, as by rivets or small bolts and nuts, parallel vertical ears 45 and 46 made of an electrically non-conducting material. These ears 45 and 46 extend above the upper edges of the arms 38 and 39 to which they are attached. Across the rearmost ends of arms 38 and 39 is a vertical cross member 36 having a number of equally spaced vertical slots 37, the purpose for which will be explained hereinafter. Near and parallel to the upper edges of ears 45 and 46 are bored a series of six small holes 47 equally spaced apart and whose centers are on a line parallel to base element 1a as well as arms 38 and 39. A slight distance below this line of holes 47 and in a line parallel thereto are bored a series of five holes 48, each hole being slightly below and to one side of all except the rearmost hole of holes 47. Through holes 47 are placed six bar contacts 49, the left ends of which are flush with the outer surface of ear 45 whereas the right ends of the six bar contacts 49 extend through ear 46 and terminate in six parallel vertical flat contact surfaces 50 therebeyond. Through the holes below are fitted five insulating bars 75.

To the bottom of the base element 1a is secured a sub-base element 51 which extends below the rearward half of base element 1a and is secured thereto by lateral raised ends 52 and 53 and bolts 54 and 55. Sub-base element 51 extends rearward under heelpiece 2 where it forms a back plate 56 which is parallel to and rests flush against the rear of heelpiece 2 and extends laterally on either side thereof.

To back plate 56 and behind heelpiece 2 are clamped ten spaced apart rows of contactors 57, each row containing six contactors, equally spaced apart. The rows are separated by insulator elements 58 and the whole group is clamped to back plate 56 by clamping plate 59 and bolts 60 threaded through clamping plate insulators 58 and back plate 56. To that portion of the back plate 56 extending laterally to the right of heelpiece 2 is an eleventh row of six contactors 61 also clamped to plate 56 by means of clamping plate 59 and bolts 60. Below the plane of the sub-base 51, each of these sixty-six contactors 57 terminates in a conventional terminal end. All contactors 57 extend upward vertically so that their contacting ends each stand forwardly adjacent to a bar contact. The first file of ten wipers stand forwardly adjacent the foremost bar contact, the second file forwardly adjacent the second foremost bar contact and so on six files deep. The eleventh row of contactors 61 are clamped vertically and tensioned to permanently engage the flat vertical contact surfaces 50, which, as explained before, form the right extremities of bar contacts 49. To insure better contact surfaces, the contacting ends which are to contact bar contacts 49 may be split vertically forming conventional twin contacts. To the left of the contactors 57, separated by insulators and bolted to the rear of the left lateral extension of back plate 56 is a set of break before make springs 61a, the operation of which will be described hereinafter.

Applicant up to this point has described the elements of his invention which are incidental to and recipient of the mechanical movement of the switch. The mechanical mechanism and cooperating elements will now be described fully, with relationship to the structure already described.

Ears 3 and 4 have axially aligned holes bored therethrough which holes serve as bearing surfaces for shaft 62. Shaft 62 is flush with the outer surface of ear 4 but extends a slight distance to the left beyond the outer surface of ear 3. On either side of ear 3, and adjacent the inner surface of ear 4, shaft 62 has three holes bored vertically therethrough. Into the upper end of the hole adjacent the outer surface of ear 3 is placed as by force fit an end of an L shaped pin 63 so that the short leg thereof parallels the axis of shaft 62. This short leg of pin 63 serves as a crank for rotating shaft 62 by means to be described later. Into the upper openings of the remaining two vertical holes in shaft 62 is placed as by force fit the legs of an inverted U shaped stiff wire release lever 64, the base of the inverted U paralleling shaft 63 and situated a slight distance above and forward from the axis thereof. Both L shaped crank pin 63 and release lever 64 may be made of a stiff wire such as Phosphor bronze. Also rotatably mounted on shaft 62 between ears 3 and 4 and equally spaced apart and therefrom are ten cocking levers 66 and 70. The lower portion of the cocking levers 66 (Fig. 6) have a bore for mounting on shaft 62 and slightly upward and to the right thereof a second small hole 67 to secure an end of a coil spring to be explained later. All the cocking levers in normal position are substantially vertically above shaft 62 and in planes perpendicular to the axis thereof. All cocking levers have heads 68 which are formed by cutting a recess 69 into the forward edge of the lever lengthwise from just above hole 67 to immediately below head 68. The first cocking lever 70 (Fig. 7) is positioned adjacent the inner surface of ear 3 on shaft 62 and has an additional recess 71 which enables it to have a step 72 immediately below head 68, unlike any of the other nine cocking levers. The purpose for this step 72, and additional recess 71 will be described later.

At the lower extremities of the upper forward portions of ears 3 and 4 are axially aligned holes 73 which serve as mounting holes for shaft 74. Shaft 74 has both ends knurled and tightly fitted into holes therefor in ears 3 and 4 to secure it therein. Rotatably mounted on shaft 74 between these portions of ears 3 and 4 and equally spaced apart and therefrom are ten finger members 76. Each finger member (Fig. 8) has three fingers, an upper finger 77, horizontal finger 78 and lower finger 79. The lower finger and horizontal finger of each finger member lie in the same plane. However, the upper finger of each finger member lies in a parallel plane a slight distance to the left of the plane of the other two fingers. This upper finger is rigidly held in its adjacent plane just described by a connecting strip 80. These finger members 76 and the cocking levers 70 and 76 form the cocking mechanisms of the switch.

Figure 4:
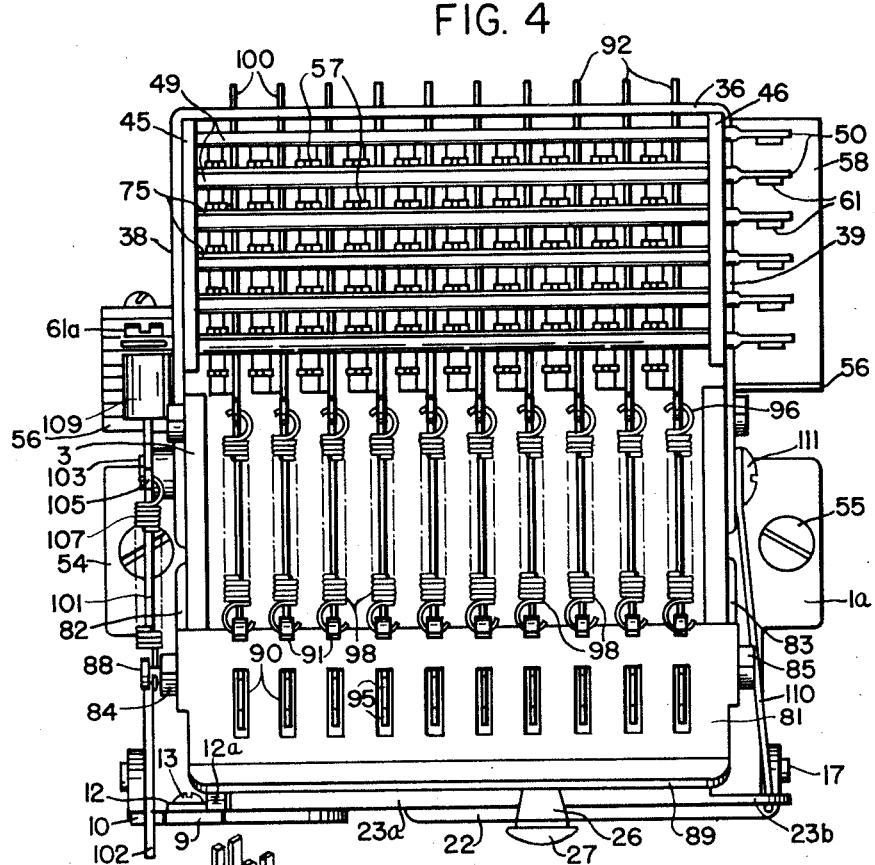
Fig. 4 is a top view of the selector.

Across the top of the upper and foremost portion of ears 3 and 4 is a horizontal slotted cross member 81. Slotted cross member 81 has two lateral ears 82 and 83 which are bent 90 degrees downward from the horizontal portion of the member and fit over the outside surface of ears 3 and 4. These ears are secured to ears 3 and 4 by bolts 84 and 85 further secured by inwardly bent tips 86 and 87 which fit into slots 40, also in ears 3 and 4. Bolt 84 has a second nail like raised head 88 the purpose for which will be set out later. Slotted member 81 has attached thereto a substantially vertical forward wall 89 whose purpose will also be set out later. Between ears 3 and 4 in slotted member 81 (Fig. 4) are ten rectangular slots 90 running longitudinally and equally spaced apart. Rearward of slots 90 and along the rearward edge of slotted cross member 81 directly behind each of slots 90 are upward and forwardly bent hooks 91.

Positioned side by side immediately below slots 90 and running longitudinally rearward through the entire depth of the switch and contractor banks in the rear thereof are ten driving members or push bars 92 (Fig. 5). Each driving member 92 is supported by a leg 93 which always rests on the horizontal finger 78 (Fig. 12) of its associated finger member 76 directly below. An upper finger 77 of each associated finger member 76 is positioned with its tip to the left of its associated push bar 92. Each push bar 92, except the last, has a rigidly attached short horizontal side arm 94 near its forward end and therebelow. Side arms 94 always extend to the right of each push bar, except the last, and are located sufficiently near the forward end of each push bar so as to be engaging the upper finger of the next adjacent finger member to the right when at normal. Each push bar 92 in addition has a two step riser 95 near the forward end and thereabove. In normal position with leg 93 resting on horizontal finger 78 of its associated cocking mechanism below, riser 95 including both steps thereof will be projecting upward through slots 90 of cross member 81. About center longitudinally, each driving member 92 has therefrom and projecting upward another arm 96, each of said arms 96 having a small hole 97 bored therethrough. Small coil springs 98 are secured at one end from holes 97 of the push bar's arm 96 and the other end secured to hooks 91 rearward of slots 90 on horizontal cross piece 81. All springs 98 are positioned side by side over their respective push bars 92. Extending rearward, each push bar is attached by means of insulators 62' and rivets to a rank of six contactors 57 forming a group thereof. Affixed to the push bars 92 in normal position, the contactors 57 are out of engagement with bar contacts 49. The rearmost end of each push bar has a short recess 99 along its upper edge and a small hook 100 at its very end extending upward. Each rearward end of a push bar 92 is fitted into a vertical slot 37 in the rear vertical cross member 36 of arms 38 and 39. When in normal position these hooks 100 rest against the rear surface of cross member 36, above the vertical slots 37 therein and do not permit push bars 92 to move any further forward under compulsion of coil springs 98 and so limit the longitudinal stroke of said push bar driving members 92.

A set of cocking mechanism coil springs 101 (Fig. 12) are attached at one end onto lower finger 79 at hook 79a on the end thereof and at the other end to hole 67 of each associated cocking lever 70 and 66 which as stated before are in the same plane therewith.

Below the cocking mechanisms just described, secured to the heelpiece 2 are two electro-magnets 5 and 6. Electro-magnet 5 is the release and initial cocking magnet and 6 is the stepping or operating magnet for the switch. The cores of the magnets extend longitudinally from the heelpiece 2 to the forward edge of base element 1a. Each magnet has a separate armature, 9 and 22 respectively. Both armatures are pivotally secured by a common pin 17 to base 1a by yokes 19 and 31 secured therethrough to the base by bolts 20 and 32 respectively. The type of yoke used is not uncommon and will therefore not be further detailed.

Figure 1:
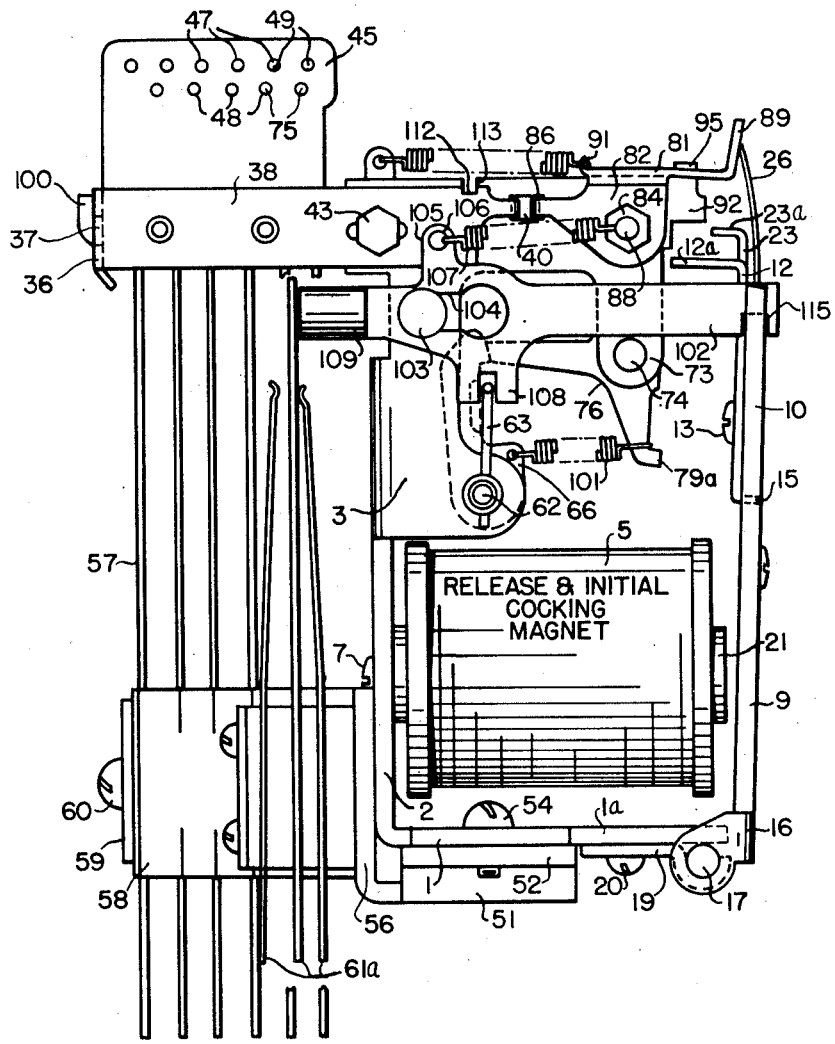
Fig. 1 is a side view of the complete selector.

Armature 9 of release relay 5 (Figs. 1 and 2) at its upper left is elongated into an arm 10 having a short vertical slot 11 therein. This slot engages a similar slot 115 in slidable connecting rod 102 which is slidably mounted on pin 103 in slot 104. An extension 105 to connecting rod 102 located above slot 104 has a hole 106 bored therethrough. A small tension spring 107 is attached at one end to hole 106 and at the other end to extended head 88 of bolt 84 in ear 3 and provides restoring tension therefor. Below slot 104 on slide bar 102 is a vertically slotted extension 108, which slot engages the short leg of L shaped crank pin 63. The rearward end of slide bar 104 is equipped with a buffer 109 which engages the center spring of the break before make springs 61a. Affixed to the upper right end of armature 9 is a narrow L shaped pawl 12 attached by bolt 13 in tapped hole 13a and bent projection 15 thereof into slot 14.

Figure 3:
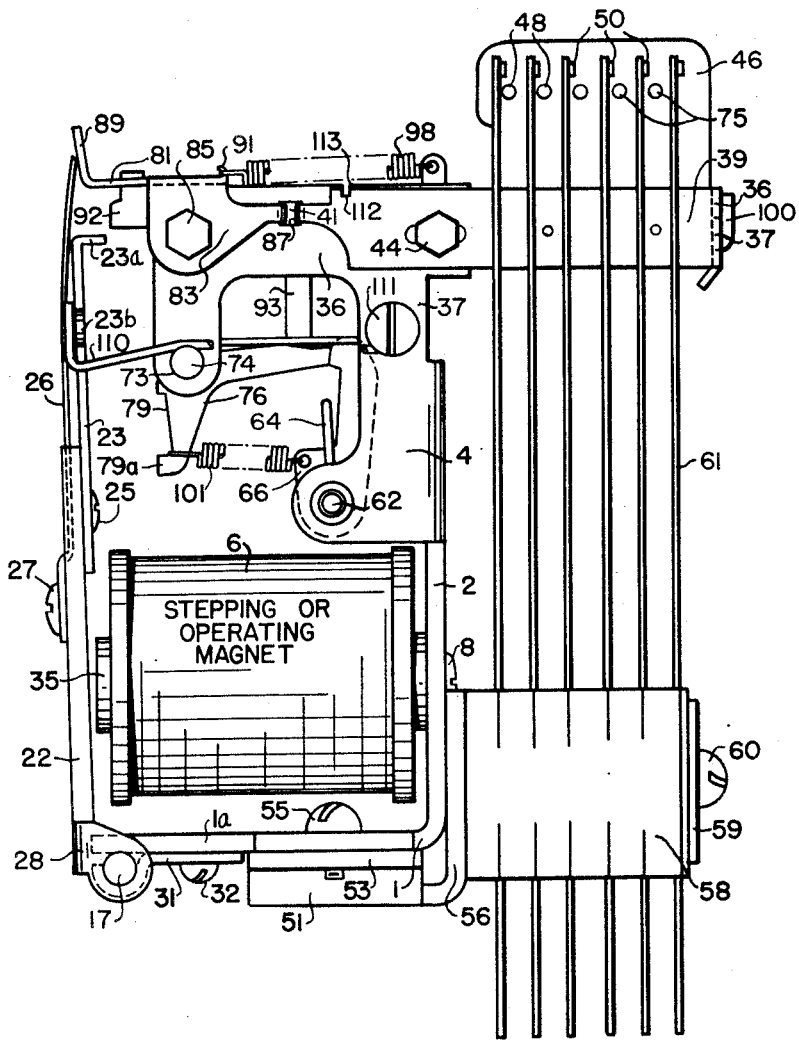
Fig. 3 is the other side view and more particularly the right side view with relation to the front as shown in Fig. 2.

Stepping armature 22, like release armature 9 is secured to base 1a pivotally by pin 17 and yoke 31 and bolt 32 in conventional manner. Armature 22 has a flat, wide L shaped pawl extension 23, the short leg 23a (Fig. 3) normally positioned just below all ten push bars 92. Extension 23 is secured to armature 22 proper by bolts 24 and 25.

A flat release spring 26 for stepping magnet armature 22 is provided and secured thereto by bolt 27. Flat spring 26 is flexed against vertical wall 89 of slotted cross member 81 and bent thereagainst holding the armature normally away from stepping magnet 6.

Extension 23 has along its right hand edge a release stop finger 23b which when the switch is in normal position engages release stop hook 110 secured to ear 4 by bolt 111.

An adjusting notch 113 (Figs. 1 and 3) is cut into the upper edge of ears 3 and 4 and a similar adjusting notch 112 reaching to the same depth is cut in arms 38 and 39 to closely coincide with the notches 113. When bolts 43 and 44 holding arms 38 and 39 to ears 3 and 4 are loosened and a screw driver is placed in the notches 112 and 113, by gently rotating the screw driver, arms 38 and 39 can be moved sufficiently forward or rearward so that risers 95 on driving members 92 do not bind in slots 90 of horizontal cross piece 81. For this reason, slots 40 in ears 3 and 4 into which ends of arms 38 and 39 are bent are elongated to permit adjustment. Arms 38 and 39 also for this purpose have longitudinal slots beneath bolts 43 and 44.

When no bind is apparent, bolts 43 and 44 are again tightened and the switch is in adjustment for operation.

*Operation*

Having described the mechanism of the invention in detail, a detailed description of the operation thereof follows.

When a current impulse is sent through the winding of release electro-magnet 5, its armature 9 pulls up. It will be remembered that armature 9 has two actuating members attached thereto, namely slidable connecting rod 102 and pawl 12. Slide bar 102 (Fig. 1) moves rearward under compulsion of armature 9 and in so doing rotates the L shaped crank pin 63 counter-clockwise (Figs. 9 and 10) which in turn rotates shaft 62. The U release lever 64 rigidly affixed to shaft 62 in approximately the same plane as the L pin 63 is thereby also rotated and pressed against the recessed edges 69 of all cocking levers 66 except the first cocking lever 70. The first cocking lever 70 (Fig. 7) is provided with an additional recess 71 so that it is not pressed by the U release bar 64 and is permitted to remain in its forward or cocked position. Any remaining cocking lever 66, however, which might be forward in operated position is rotated rearward by release lever 64 until its head 68 is disengaged from the horizontal finger 78 of its associated finger member 76. Mechanism coil spring 101 associated and joining associated cocking levers and finger members then compels the finger member disengaged to rotate clockwise (Figs. 1 and 9) and in so doing forces driving member leg 93 resting on the horizontal finger upward thereby returning the lowered driving member 92 to normal. In this manner all driving members 92 except the first are returned to normal (Fig. 10), so that their forward driving edges are immediately above leg 23a of stepping pawl extension 23.

At the same time, release pawl 12 engages the upper finger 77 (Fig. 9) of the first finger member 76 and drives it forward. This in turn drives horizontal finger 78 thereon angularly downward permitting the first driving member or push bar 92 whose leg 93 is resting thereupon to move downward. This downward position is maintained by horizontal finger 78 moving down head 68 of the first cocking lever 70 until it slides thereunder and rests so engaged on step 72 beneath the head of said first cocking lever (Fig. 10).

As armature 9 operates slide bar 102, buffer 109 operates the break before make contacts 61 in the rear thereof for control purposes not essential to the present invention. The operation just described is shown in steps in Figs. 9 and 10. In Fig. 9 the pawl 12 is just engaging finger 77 of the first finger member 76 and the horizontal finger 78 associated therewith still rests against the forward edge of cocking lever head 68 of first cocking lever 70. Fig. 10 shows the first finger member driven counterclockwise at the full stroke of pawl 12 and engaged under head 68 upon step 72, and also shows the second driving member 92 in its normal restored position.

The switch is now prepared for its selecting or counting operation. A series of current impulses are sent through the winding of the operating electro-magnet 6. In operating, armature 22 is pulled up and leg 23a of extension pawl 23 thereof which normally rests below push bars 92 strikes the first push bar which has been lowered by the operation of the release magnet pawl 12a on the first cocking mechanism already described. Such an operation is shown in Fig. 11, leg 23a of pawl extension 23 having pushed first driving member 92 to the full extent of its longitudinal stroke. In so doing, two things happen. Leg 93 of the push bar 92 being operated is moved backward against head 68 of the first cocking lever 70 causing cocking lever 70 to rotate until horizontal finger 78 of the first finger member 76 is free of head 68. Cocking mechanism spring 101 attached to lower finger 79 of the first finger member then forces the finger member by its stored energy to rotate clockwise forcing leg 93 and attached push bar 92 upward toward its normal position when the magnet is deenergized. This vertical movement would occur completely at this time at the full stroke of pawl 23a if it were not for risers 95 beneath horizontal cross member 81 which permit the vertical restoration only stepwise into slots 90 during the longitudinal restoration of the push bar 92.

Meanwhile, the second occurrence, as the first driving member 92 is being driven longitudinally by pawl 23 is the engagement of its push bar side arm 94 with the upper finger 77 of the next adjacent finger member 76 rotating it counterclockwise as indicated in Figs. 11 and 12 mostly in dotted lines. As this next finger member 76 rotates it slides its horizontal finger 78 down head 68 of its associated cocking lever 66 until it engages or cocks thereunder. And consequently as the next horizontal finger rotates downward, leg 93 of the next adjacent driving member 92 riding thereon is free to follow. The next push bar however, does not drop immediately, as its forward end is now resting on the upper surface of pawl 23a which is at its full stroke.

As the driving member 92 nears its full longitudinal stroke, the group of contactors 57, insulated from and attached thereto by insulators 62′, leave their insulating bars 75 and are moved rearward and into contact simultaneously with bar contacts 49. In this manner, the instant embodiment affords six simultaneous contacts for a like number of connections which may be made to the terminal ends of contactors 57 and those of the eleventh row 61 in contact with the squared ends 50 of bar contacts 49.

Figure 2:
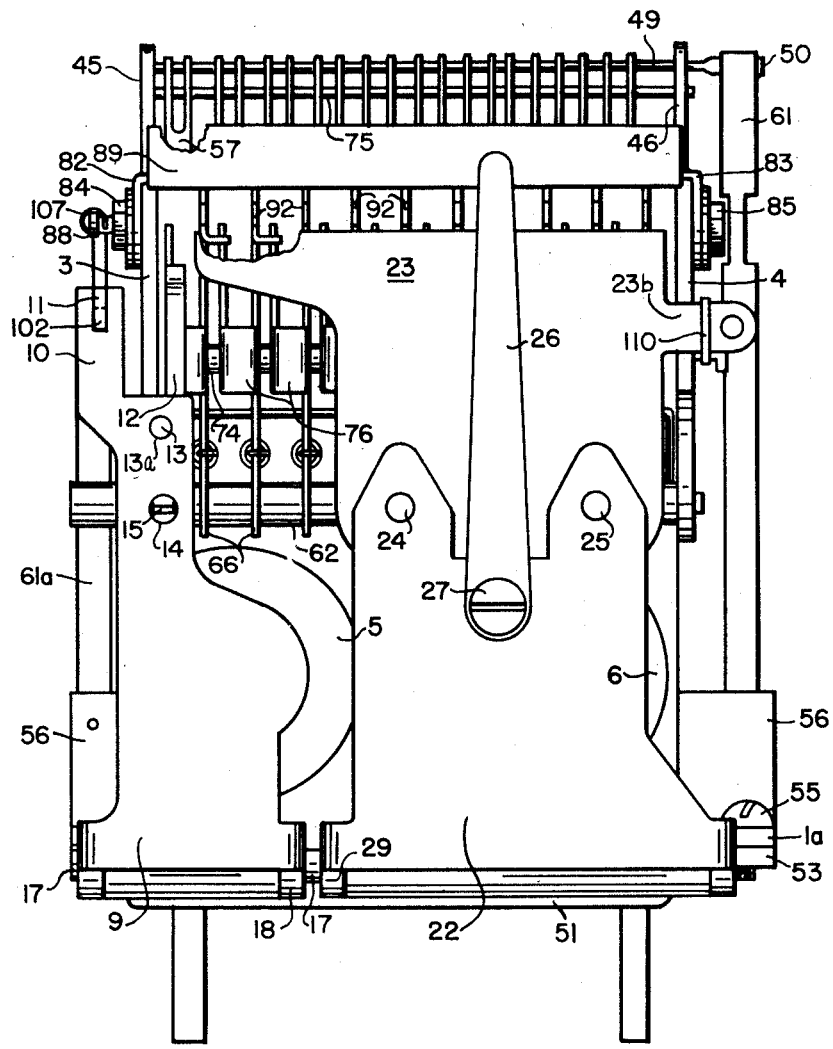
Fig. 2 is a front view of the device and for simplification of description of component elements will be used as a directional reference position.

Upon deenergization of stepping magnet 6, armature 22 and pawl 23 restore to normal under compulsion of flat spring 26 shown in Fig. 2. The first push bar 92 now restores longitudinally under compulsion of its associated coil spring 98 attached to arm 96 and hook 91 on the horizontal cross member 81, breaking its attached group of contactors from bar contacts 49. As the driving member 92 restores longitudinally, it restores vertically stepwise into its corresponding slot 90 in the horizontal cross member 81 shown in Figs. 4 and 12, as the riser 95 comes therebeneath. Meanwhile, as pawl 23 restores, the next push bar is free to drop and so does. The first driving member 92 has gone through a complete cycle of vertical and longitudinal reciprocation and the switch is now ready to repeat this cycle with respect to the second driving member 92 as the next impulse is received by operating magnet 6. Each push bar 92 is driven forward sequentially determined by the number of impulses transmitted to the operating magnet 6, each push bar 92 in turn releasing its own cocking mechanism and cocking the next adjacent mechanism for lowering the next push bar 92. The cocking mechanism cycle is as shown in Fig. 11.

This action continues, determined by the number of pulses into the stepping magnet 6 until the last push bar 92 is dropped into operating position and reciprocated. Since the last push bar 92 has no adjoining finger member 80 to engage, there is no necessity for it to have a side arm 94. When this last driving member 92 has been restored, the switch can no longer select until a pulse into the release magnet 5 again drops the first push bar 92 into operating position.

Similarly, if less than a full train of ten impulses are sent into the operating magnet 6, for the switch to begin counting anew, a pulse must be first sent into the release magnet 5 so that the release bar 64 can release any operated cocking mechanism and the release pawl 12a may effect the dropping of the first driving member 92.

In this respect, the functions of the switch may be likened to that of a ten point minor switch.

Having described in detail the mechanism and the operation thereof in this invention, what we claim and desire to be protected by issuance of Letters Patent of the United States is:

1. A switch comprising a magnet, an armature, a plurality of successive driving members directly engageable and operable by said armature, a plurality of sets of contact springs respectively associated with and operable by said driving members, a plurality of interlinking members respectively carried by said driving members, and means including the interlinking member carried by any one of said driving members for causing only the next succeeding one of said driving members to be engaged and operated each time said armature is actuated by said magnet so as to operate the corresponding one of said sets of contact springs in order to establish succeeding temporary electrical connections.

2. In a counting device including a magnet for receiving a series of magnetizing impulses, an armature therefor having an operating path, a plurality of driving members corresponding respectively to said impulses, each of said driving members having a normal position disposed out of the path of said armature and a prepared position disposed in the path of said armature, each of said driving members in its prepared position being engageable and movable in turn by said armature in response to the magnetic force emanating from said magnet and attracting said armature to count the corresponding impulse, interlinking means normally maintaining each of said driving members in its normal position, means for moving the first of said driving members from its normal position into its prepared position, whereby only the first of said driving members in its prepared position is engaged and moved by said armature to count the first impulse, and means for successively moving further of said driving members from their normal positions into their prepared positions during the counting operation in sequence with their respective corresponding impulses, each of said driving members being returned immediately to its normal position upon termination of the impulse corresponding thereto.

3. In a counting device including a magnet for receiving a series of magnetizing impulses, an armature therefor having an operating path, a plurality of driving members corresponding respectively to said impulses, each of said driving members having a normal position disposed out of the path of said armature and a prepared position disposed in the path of said armature, each of said driving members in its prepared position being engageable and movable in turn by said armature in response to the magnetic force emanating from said magnet and attracting said armature to count the corresponding impulse, interlinking means normally maintaining each of said driving members in its normal position, means for moving the first of said driving members from its normal position into its prepared position, whereby only the first of said driving members in its prepared position is engaged and moved by said armature to count the first impulse, and means for successively moving further of said driving members from their normal positions into their prepared positions during the counting operation in sequence with their respective corresponding impulses.

4. In a counting device as set forth in claim 3, said interlinking means linking each said further driving member to the next succeeding driving member, said interlinking means serving also to impart a preliminary preparatory movement to a driving member responsive to movement of the next preceding driving member.

5. In a counting device as set forth in claim 3, said interlinking means including yieldable means coupling each driving member except the last with the next succeeding driving member, each driving member except the last serving to apply force to the coupling means between it and the next succeeding driving member incident to the execution of its movement to count the corresponding impulse, said armature in attracted position restraining the concerned succeeding driving member from responding to such force until the instant the armature restores when said impulse is terminated, said driving member thereupon yielding to said applied force by moving into its prepared position, whereby said driving member is engaged and executes its counting movement responsive to the attraction of said armature in its corresponding impulse next succeeding.

6. In a counting device including a magnet operative responsive to a series of magnetizing impulses transmitted thereto, an armature for said magnet, a plurality of driving members commonly associated with said armature and corresponding respectively to said impulses, each of said driving members having a normal position disposed out of the path of said armature and a prepared position disposed in the path of said armature, each of said driving members in its prepared position being engageable and movable in its turn by said armature in response to magnetic force emanating from said magnet attracting said armature to count the corresponding impulse, means normally maintaining each driving member except the first in its normal position, means for moving the first of said driving members from its normal position into its prepared position, whereby only the first of said driving members in its prepared position is engaged and moved by said armature to count the first impulse, and means responsive to the counting of the impulse by any one of said driving members except the last for causing the next succeeding driving member to move from its normal position into its prepared position.

7. In a counting device as set forth in claim 6, said last mentioned means responsive to the termination of the particular impulse counted also restoring the driving member associated with the said particular impulse counted to its normal position.

8. In a counting device including a magnet operative responsive to a series of magnetizing impulses transmitted thereto, an armature for said magnet, a plurality of driving members associated with said armature and corresponding respectively to said impulses, and inter-driving member cocking means coupling adjacent driving members, each of said driving members having a normal position disposed out of the path of said armature and a prepared position disposed in the path of said armature, each of said driving members in its prepared position being engageable and movable in turn by said armature in response to magnetic force emanating from said magnet attracting said armature to count the corresponding impulse, each driving member after the first being controlled through the concerned inter-driving member cocking means dependent upon the preceding driving member having executed its said counting movement to execute a movement from its normal position into its prepared position rendering it operative to execute a counting movement responsive to the next succeeding impulse.

9. In a counting device as set forth in claim 8, said driving member executing its movement from its normal position into its prepared position by the restoration of said armature in response to the termination of the impulse preceding the one to which said driving member corresponds.

10. In a counting device as set forth in claim 8, said inter-driving member cocking means normally preventing each driving member except the first from moving to count any said impulse, said same cocking means prepared responsive to each actuation of said armature and rendered effective responsive simply to the retraction thereof for nullifying its preventing function with respect to the next succeeding driving member.

11. In a counting device as set forth in claim 8, said inter-driving member cocking means normally preventing each driving member except the first from moving to count any said impulse of force, said same cocking means prepared responsive to the counting movement of each driving member preceding the last and rendered effective responsive simply to the termination thereof for nullifying its said preventing function with respect to the next succeeding driving member.

12. In a selecting switch, a horizontal base element, a plurality of contactor groups arranged side by side connected movably to said base element, a plurality of driving members having vertical and longitudinal reciprocating movements with relation to said base, each of said driving members connected to an individual one of said contact groups, a plurality of mechanisms operative to impart said vertical reciprocating movements to said driving members, and means for operating said mechanisms sequentially as well as for sequentially moving said driving members in said longitudinal reciprocating movements.

13. In a selecting switch of the counting relay type, a horizontal base, a plurality of contactor groups arranged side by side connected to said base, a plurality of driving members having reciprocating vertical and longitudinal movements with relation to said base, each of said driving members connected to individual ones of said contactor groups, a plurality of mechanisms, an individual one of said mechanisms associated with each of said driving members operative to impart said vertical reciprocating movement thereto, a first magnet provided with a first armature, a first pawl connected to said first armature, means for operating said first magnet, said first pawl responsive to operation of said first magnet engaging and operating one of said individual mechanisms, a second magnet provided with a second armature, a second pawl connected to said second armature, said second magnet operable subsequent to operation of said first magnet, said second pawl sequentially driving said driving members and sequentially operating the remaining associated mechanisms, each of said driving members moving first in a downward stroke of said vertical movement and then in said longitudinal reciprocating movement and then in an upward stroke of said vertical movement.

14. In a selecting switch as set forth in claim 13, a slidable rod movably connected to said first magnet armature and positioned against one of said groups of contactors, said one contactor set operative responsive to the movement of said first armature and said slidable rod connected thereto.

15. In a selecting switch as set forth in claim 13, each of said driving members having a leg therebelow and a side arm, said leg being arranged to engage its associated individual mechanism and said side arm being arranged to engage an adjacent mechanism associated with the next adjacent driving member, said legs and said side arms cooperating with said individual mechanisms for sequentially positioning said driving members.

16. In a selecting switch as set forth in claim 13, said driving members each having another arm extending thereabove, a horizontal cross member suspended above and near the forward ends of said driving members, a plurality of hooks on said cross member each associated with a particular driving member therebelow, and a plurality of restoring springs connecting said driving element arms to said cross member hooks for restoring said driving members in said longitudinal reciprocating movement thereof.

17. In a selecting switch as set forth in claim 13, each of said driving members having a leg therebelow and a side arm; said individual mechanisms each comprising a rotatably mounted cocking lever and a rotatably mounted finger element, a head on said cocking lever and an extended recess in the forward edge thereof, three fingers on said finger element comprising a horizontal finger and a lower finger both in a common plane with said cocking lever and an upper finger in an adjacent plane, all three of said fingers rigidly connected one to another, and a second coil spring joining the end of said lower finger to the lower portion of said cocking lever; the tip of said horizontal finger normally resting against the forward edge of said cocking lever head and said driving member leg normally resting on the upper edge of said horizontal finger and said driving member side arm normally engaging said upper finger immediately adjacent; the first of said mechanisms substantially as set forth except that the upper finger of said finger element therein engages said pawl, said pawl responsive to operation of said magnet moving said first mechanism upper finger forward thereby causing said rigidly attached horizontal finger to move downward along said forward edge of said cocking lever head until immediately therebelow, said coil spring compelling said cocking lever to engage said horizontal finger in that part of said recess immediately below said head, said leg and attached driving arm following the descent of said horizontal finger in the first stroke of said vertical reciprocating movement of said driving element, said second pawl driving said lowered driving member forward, said side arm on said driving member pushing the upper finger of the next adjacent individual mechanism forward to drop the next adjacent driving member for the next step, in driving said driving member forward said leg thereon pushes the head of said cocking lever backward until said horizontal finger is free of said recess therebelow, said mechanism connecting spring pulling said lower finger and urging said horizontal finger upward, said driving member being urged outward by said first spring to complete said horizontal reciprocating action, said driving member in its outward movement being urged upward by said horizontal finger beneath its attached leg completing said vertical reciprocating motion, and said cycle being repeated sequentially by reoperation of said second magnet.

18. In a selecting switch as set forth in claim 17, said cocking lever in said first mechanism having a second recess within the confines of said first recess, a pin upon which said cocking levers are mounted, a U shaped release rod rigidly mounted into said pin, another rod for rotating said pin and attached release rod, a slidable connecting rod movably connected to said first armature and said other rod, said first armature operating in response to operation of said first magnet causing said connecting rod to push said other rod rotating said pin, thereby causing said U rod to engage the recessed edge of any cocked cocking lever and push said cocked cocking levers back releasing its associated horizontal finger and thereby returning any lowered driving member upward to its normal position, while said first pawl cocks said first cocking lever in the manner set forth, said first cocking lever not releasing due to its additional recess into which said U shaped release bar enters without releasing effect.

19. In a selecting switch as set forth in claim 13, a hook and a recess on one end of each of said driving members, a vertical cross member suspended laterally across said switch, a plurality of vertical slots in said vertical cross member, said hooked and recessed ends of said driving members fitted through said slots so that said hooks are on one side of said cross member and above the upper edges of said slots and the edges of said recesses are on the other side of said slots and above the upper edge thereof, said hooks and recesses in said slots determining the length of the stroke of said horizontal reciprocating movement of said driving members.

20. In a selecting switch as set forth in claim 13, a horizontal cross member suspended laterally across said switch, a plurality of longitudinal slots in said horizontal cross member, a two step riser connected to and extending above each of said driving members near one of the ends thereof, both steps of said risers positioned into said slots when said switch is at normal and only the upper step of said risers positioned in said slots during said horizontal reciprocating movement, said upper riser step guiding and preventing lateral displacement of said driving member during said last mentioned movement thereof, said lower step being beneath said horizontal cross member during substantially the whole of said reciprocating horizontal movement and preventing the said upward stroke of said vertical reciprocation from occurring until the whole of said horizontal reciprocation is substantially completed.

21. In a selecting switch as set forth in claim 13, each group of said contactors comprising a plurality of contactors arranged one behind the other in a rank, corresponding ones of said contactors in said plurality of groups side by side forming files thereof, a plurality of bar contacts insulated one from another and corresponding to the number of files, individual ones of said bar contacts suspended between said files and the last bar contact suspended beyond the last of said files, said driving members attached to individual groups of said contactors, each contactor in such individual group making a plurality of contacts with said bar contacts when driven by said horizontal reciprocating movement of its connected driving member.

22. In a selecting switch as set forth in claim 13, a base element, a heelpiece rigidly attached to said base element, parallel ears rigidly attached to said heelpiece, said plurality of cocking mechanisms rotatably mounted on pins between said ears, cocking levers in each mechanism, extensions from said ears, a vertical cross member rigidly connecting the extending ends of said extensions, a plurality of vertical slots in said vertical cross piece, a horizontal cross piece laying over said ears and rigidly attached thereto, a plurality of slots in said horizontal cross member, a plurality of hooks at one end of each of said horizontal slots, a leg on each of said driving members, each leg positioned upon an associated one of said mechanisms, a side arm on each of said driving members and arranged to engage an adjacent one of said mechanisms, a plurality of spring members, said springs joining said driving members and said hooks, one end of each of said driving members being hooked and recessed, the other ends having risers thereon, said hooked and slotted ends being mounted slidably in said vertical slots of said vertical cross member, said risers being slidably positioned in said horizontal slots, a U shaped release rod positioned across all cocking levers of said mechanisms, a slidable rod connecting said release rod and said armature, said first magnet operable through said pawl to cock a first of said mechanisms and thereby lower the driving member resting by said leg thereon and also to drive said release rod with said connecting rod so as to release any cocked ones of said mechanisms, said second magnet then operable for sequentially driving each of said driving members in a vertical and horizontal reciprocating movement with relation to said base, said driving members each cocking the next adjacent cocking mechanism as said second magnet and pawl drives them sequentially one at a time, said spring members cooperating in said reciprocating movement, said connected contactor groups making a plurality of contacts during each reciprocating movement of said attached driving member, said risers laterally guiding said driving members, said hooked and recessed ends determining the length of the stroke of said driving members during said reciprocating movement thereof.

KENNETH W. GRAYBILL.
HANS SENGEBUSCH.

References Cited in the file of this patent

UNITED STATES PATENTS

| Number | Name | Date |
|---|---|---|
| 1,850,972 | Tracy | Mar. 22, 1932 |
| 2,127,322 | Blomberg | Aug. 16, 1938 |
| 2,305,450 | Stibitz | Dec. 14, 1942 |
| 2,340,087 | Stapleton | Jan. 25, 1944 |
| 2,441,001 | Bellamy | May 4, 1948 |
| 2,452,568 | Harrison | Nov. 2, 1948 |
| 2,456,169 | Bellamy | Dec. 14, 1948 |
| 2,487,015 | Bellamy | Nov. 1, 1949 |